US012793262B2

(12) United States Patent
Horiuchi et al.

(10) Patent No.: US 12,793,262 B2
(45) Date of Patent: Nov. 10, 2026

(54) ASSISTANCE CONTROL DEVICE, ASSISTANCE CONTROL METHOD, AND COMPUTER-READABLE STORAGE MEDIUM

(71) Applicant: HONDA MOTOR CO., LTD., Tokyo (JP)

(72) Inventors: Moriya Horiuchi, Saitama (JP); Takahiro Kurehashi, Saitama (JP); Yuta Sakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 87 days.

(21) Appl. No.: 18/738,053

(22) Filed: Jun. 9, 2024

(65) Prior Publication Data

US 2025/0045954 A1 Feb. 6, 2025

(30) Foreign Application Priority Data

Jul. 31, 2023 (JP) ................................ 2023-124175

(51) Int. Cl.

*G05D 1/00* (2024.01)
*G01C 21/30* (2006.01)
*G06T 7/73* (2017.01)
*G06V 20/56* (2022.01)

(52) U.S. Cl.

CPC ................ *G06T 7/74* (2017.01); *G01C 21/30* (2013.01); *G06V 20/588* (2022.01); *G06T 2207/30256* (2013.01)

(58) Field of Classification Search

CPC ........................................................ G06T 7/74
See application file for complete search history.

(56) References Cited

U.S. PATENT DOCUMENTS

2018/0286247 A1 10/2018 Fujita
2021/0309231 A1 10/2021 Fujita

FOREIGN PATENT DOCUMENTS

JP 2007178270 A 7/2007
JP 2009145167 A 7/2009
JP 2021111331 A 8/2021
WO 2017056247 A1 4/2017
WO 2020012208 A1 1/2020

OTHER PUBLICATIONS

Office Action issued for counterpart Japanese Application No. 2023-124175, transmitted from the Japanese Patent Office on Aug. 25, 2026 (drafted on Aug. 18, 2026).

*Primary Examiner* — Ramon A. Mercado
*Assistant Examiner* — Paul W Arellano

(57) ABSTRACT

An assistance control device includes a first obtainment unit which obtains position information of a vehicle detected in the vehicle and information indicating the travel lane of the vehicle detected by analyzing the image captured by the capturing device provided in the vehicle; a position determination unit which determines the position of the vehicle on a map based on the position information of the vehicle and the information indicating the travel lane of the vehicle, which are obtained by the first obtainment unit; and an assistance control unit which performs control for traffic assistance for the vehicle based on the position determined by the position determination unit.

16 Claims, 7 Drawing Sheets

ASSISTANCE CONTROL DEVICE, ASSISTANCE CONTROL METHOD, AND COMPUTER-READABLE STORAGE MEDIUM

The contents of the following patent applications are incorporated herein by reference:

NO. 2023-124175 filed in JP on Jul. 31, 2023.

BACKGROUND

1. Technical Field

The present invention relates to an assistance control device, an assistance control method, and a computer-readable storage medium.

2. Related Art

In recent years, efforts have been intensified to provide access to a sustainable transportation system with consideration given to even vulnerable people among other traffic participants. To realize this, research and development has been focused on to further improve traffic safety and convenience through research and development regarding a preventive safety technique. Patent Document 1-3 describes a technique to process information transmitted from a vehicle.

PRIOR ART DOCUMENT

Patent Document

Patent Document 1: Japanese Patent Application Publication No. 2009-145167

Patent Document 2: WO2020/012208

Patent Document 3: Japanese Patent Application Publication No. 2021-111331

DESCRIPTION OF EXEMPLARY EMBODIMENTS

Hereinafter, embodiments of the present invention will be described. However, the following embodiments are not for limiting the invention according to the claims. In addition, not all of the combinations of features described in the embodiments are essential to the solution of the invention.

Figure 1:
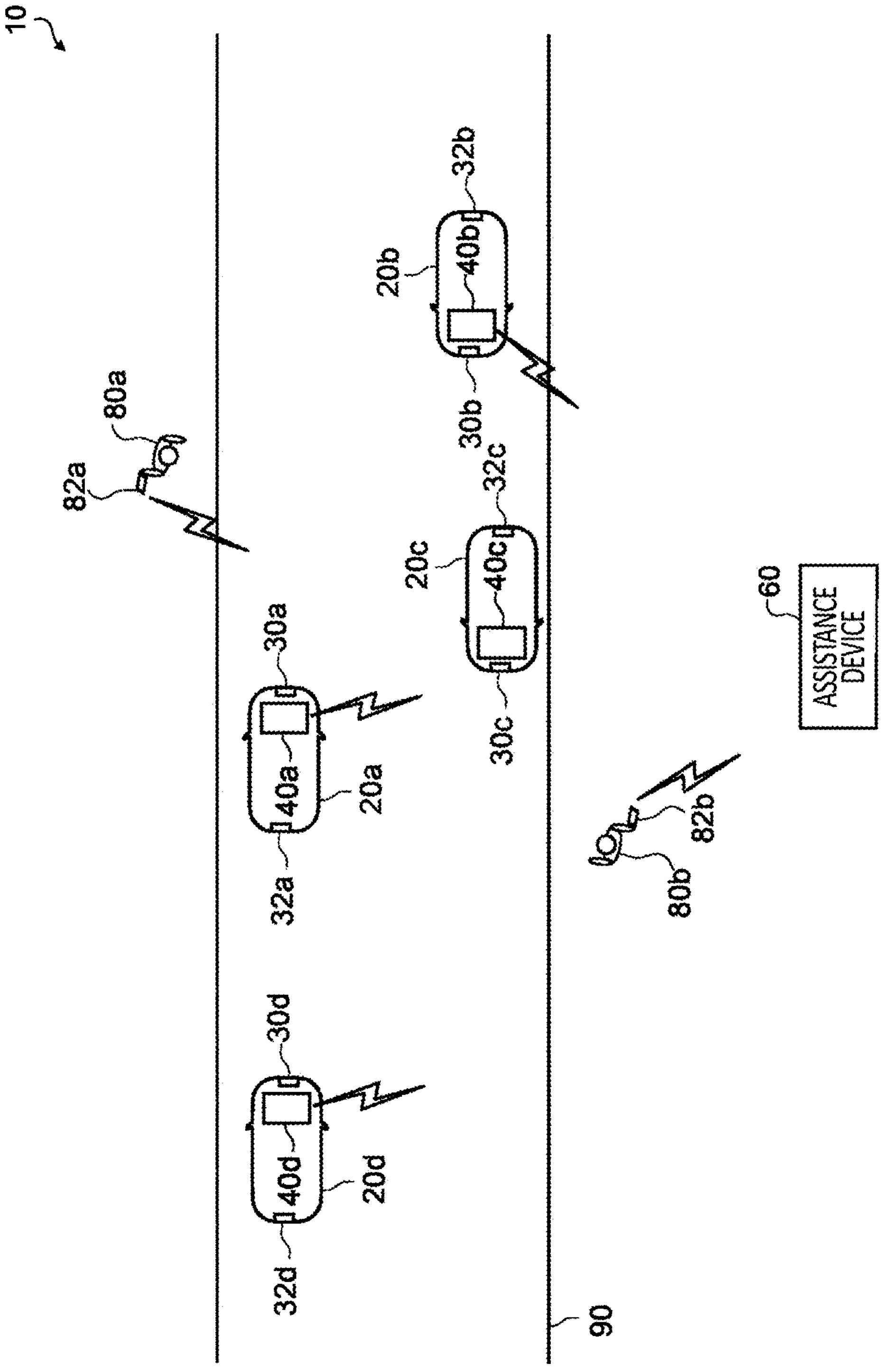
FIG. 1 schematically shows a usage scene of an assistance system 10.

FIG. 1 schematically shows a usage scene of the assistance system 10. The assistance system 10 includes the vehicle 20*a*, the vehicle 20*b*, the vehicle 20*c*, and the vehicle 20*d*, the user terminal 82*a* and the user terminal 82*b*, and the assistance device 60.

The vehicle 20*a* includes an in-vehicle processing device 40*a*, a first capturing device 30*a*, and a second capturing device 32*a*, the vehicle 20*b* includes an in-vehicle processing device 40*b*, a first capturing device 30*b*, and a second capturing device 32*b*, the vehicle 20*c* includes an in-vehicle processing device 40*c*, a first capturing device 30*c*, and a second capturing device 32*c*, and the vehicle 20*d* includes an in-vehicle processing device 40*d*, a first capturing device 30*d*, and a second capturing device 32*d*. The vehicle 20*a*, the vehicle 20*b*, and the vehicle 20*d* are vehicles in motion and the vehicle 20*c* is a vehicle at rest. The user terminal 82*a* is a terminal carried by the user 80*a* and the user terminal 82*b* is a terminal carried by the user 80*b*. In the present embodiment, the user 80*a* and the user 80*b* are pedestrians.

In the present embodiment, the vehicle 20*a*, the vehicle 20*b*, the vehicle 20*c*, and the vehicle 20*d* are sometimes collectively referred to as "vehicle 20". The in-vehicle processing device 40*a*, the in-vehicle processing device 40*b*, the in-vehicle processing device 40*c*, and the in-vehicle processing device 40*d* are sometimes collectively referred to as "in-vehicle processing device 40". The first capturing device 30*a*, the first capturing device 30*b*, the first capturing device 30*c*, and the first capturing device 30*d* are sometimes collectively referred to as "first capturing device 30". The second capturing device 32*a*, the second capturing device 32*b*, the second capturing device 32*c*, and the second capturing device 32*d* are sometimes collectively referred to as "second capturing device 32". The user terminal 82*a* and the user terminal 82*b* are sometimes collectively referred to as "user terminal 82". The user 80*a* and the user 80*b* are sometimes collectively referred to as "user 80".

The vehicle 20 is a vehicle traveling on a road 90. The vehicle 20 is an example of a movable body. The in-vehicle processing device 40 is configured to include a position sensor including a Global Navigation Satellite System (GNSS) receiver, a speed sensor such as a vehicle speed sensor, a sensor such as a ranging sensor for measuring the distance from the vehicle 20 to a surrounding object. The in-vehicle processing device 40 includes a function for processing information obtained at various sensors included in the in-vehicle processing device 40, the first capturing device 30, and the second capturing device 32, and a function for communicating with the assistance device 60. The in-vehicle processing device 40 provides an Advanced Driving Assistance System (ADAS) function which is equipped in the vehicle 20.

The first capturing device 30 is a capturing device for capturing the view ahead of the vehicle 20. The second capturing device 32 is a capturing device for capturing the view behind the vehicle 20.

The user terminal 82 is a mobile terminal such as a smartphone, for example. The user terminal 82 is an example of the movable body. The user terminal 82 periodically transmits to the assistance device 60 the current position information of the user terminal 82 detected by a position sensor including a GNSS receiver.

The assistance device 60 receives via mobile communication the information transmitted from the in-vehicle processing device 40 and the user terminal 82. The assistance device 60 may receive, via mobile communication and a communication line such as the Internet and a dedicated line, the information transmitted from the in-vehicle processing device 40 and the user terminal 82.

The assistance device 60 performs traffic assistance for the vehicle 20 based on the information received from the in-vehicle processing device 40 and the user terminal 82. For example, when it is predicted that the user 80*a* and the vehicle 20*a* will approach each other within a predetermined time based on the history of the position information and the speed information of the vehicle 20*a* received from the in-vehicle processing device 40*a* and the history of the position information of the user terminal 82, the assistance device 60 determines to perform traffic assistance for the vehicle 20*a* and the user 80*a* and instructs the in-vehicle processing device 40*a* and the user terminal 82*a* to output an alarm.

The in-vehicle processing device 40 detects the lane on which the vehicle 20 is traveling. For example, the in-vehicle processing device 40 detects the travel lane of the vehicle 20 by analyzing the image captured by the first capturing device 30 and/or the second capturing device 32. The in-vehicle processing device 40 further detects the travel lane of another vehicle 20 ahead of the vehicle 20 and the travel lane of another vehicle 20 behind the vehicle 20 by analyzing the image captured by the first capturing device 30 and the second capturing device 32. The in-vehicle processing device 40 transmits, to the assistance device 60, the detected position information of the vehicle 20, the information indicating the travel lane of the vehicle 20, the travel lane of another vehicle 20 ahead of the vehicle 20, and the information indicating the travel lane of another vehicle 20 behind the vehicle 20.

The assistance device 60 determines the position of each vehicle 20 based on the information transmitted from the vehicle 20. For example, the assistance device 60 determines for the vehicle 20*a* the position of the vehicle 20*a* based on the position of the vehicle 20*a* and the travel lane of the vehicle 20*a* which are detected by the in-vehicle processing device 40*a*. When receiving the information indicating the position of the vehicle 20*d* detected in the vehicle 20*d* traveling behind the vehicle 20*a*, the travel lane of the vehicle 20*d*, and the travel lane of the vehicle 20*a*, the assistance device 60 may further determine the position of the vehicle 20*a* based on the information detected in the vehicle 20*d* traveling behind the vehicle 20*a*. As a result, even if the position detection precision based on the signal from the GNSS satellite is low, the assistance device 60 can determine that the vehicle 20*a* is traveling on the travel lane detected by the in-vehicle processing device 40*a* and/or in-vehicle processing device 40*d* and determine the position of the vehicle 20*a* by matching the travel lane against the map information. As a result, the position determination precision of the vehicle 20*a* can be improved.

Figure 2:
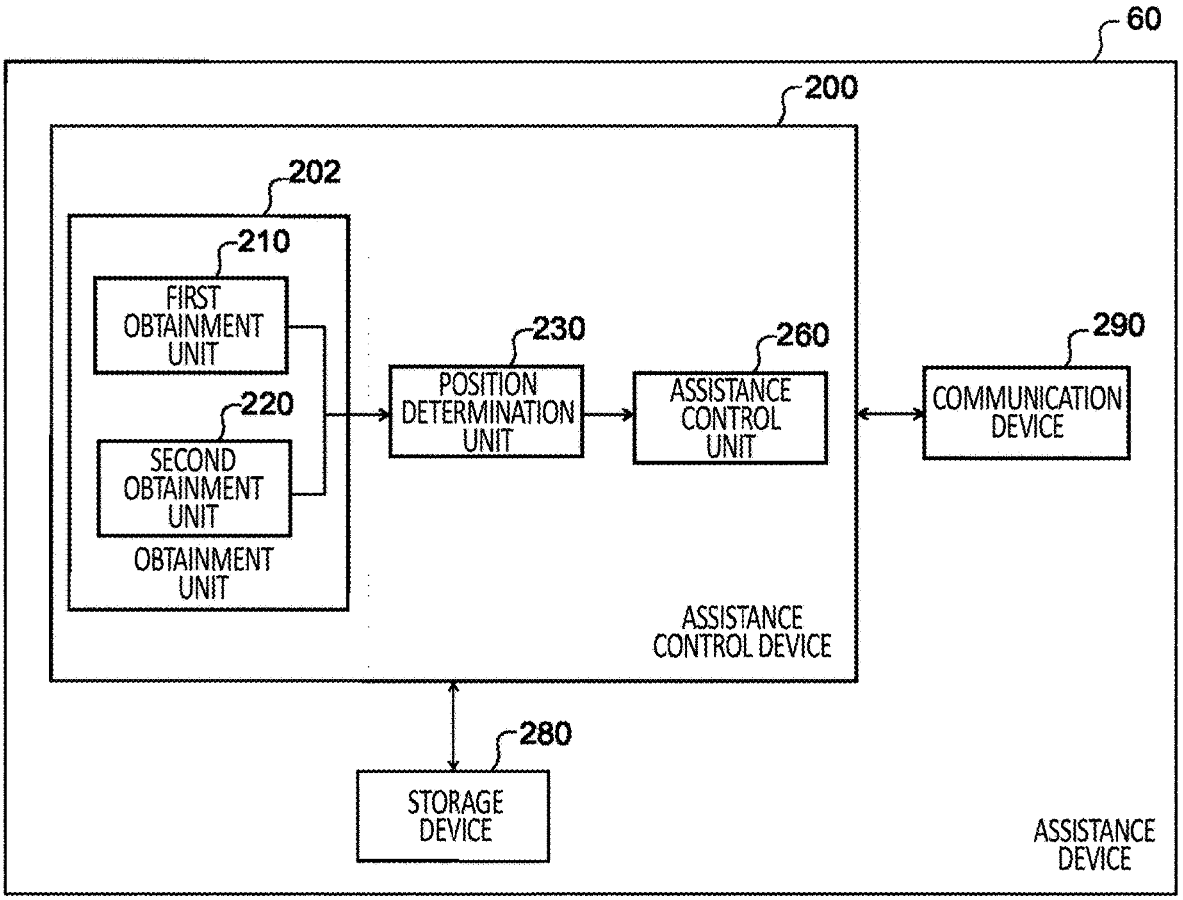
FIG. 2 shows a functional arrangement of the assistance device 60.

FIG. 2 shows the functional arrangement of the assistance device 60. The assistance device 60 includes an assistance control device 200, a communication device 290, and a storage device 280.

The communication device 290 is responsible for the communication between each of the in-vehicle processing device 40 and the user terminal 82 and the assistance device 60 based on the control under the assistance control device 200. The assistance control device 200 is implemented such that it includes a circuit such as an arithmetic processing device including a processor, for example. The assistance control device 200 may be implemented with a microcomputer including a CPU, a ROM, a RAM, an I/O, a bus, and the like. The storage device 280 is implemented by being provided with a non-volatile storage medium. The assistance control device 200 performs the processing by using the information stored in the storage device 280.

The assistance control device 200 includes an obtainment unit 202, a position determination unit 230, and an assistance control unit 260. The obtainment unit 202 includes a first obtainment unit 210 and a second obtainment unit 220. It is noted that an embodiment may be employed where the assistance device 60 does not have some functions among the functional arrangement shown in FIG. 2.

The obtainment unit 202 obtains the information transmitted from the vehicle 20 and the user terminal 82. Specifically, the first obtainment unit 210 obtains the position information of the vehicle 20 detected in the vehicle 20 and the information indicating the travel lane of the vehicle 20 detected by analyzing the image captured by the capturing device provided in the vehicle 20. The position determination unit 230 determines the position of the vehicle 20 on the map based on the position information of the vehicle 20 and the information indicating the travel lane of the vehicle 20, which are obtained by the first obtainment unit 210. The assistance control unit 260 performs the control for traffic assistance for the vehicle 20 based on the position determined by the position determination unit 230.

The second obtainment unit 220 obtains the position information of another vehicle 20, which is a vehicle other than the vehicle 20, detected in another vehicle 20, the information indicating the travel lane of another vehicle 20 detected by analyzing the image captured by the capturing device provided in another vehicle 20, and the information indicating the travel lane of the vehicle 20 detected by analyzing the image captured by the capturing device provided in another vehicle 20. The position determination unit 230 may determine the position of the vehicle 20 on the map based on the position information of the vehicle 20 and the information indicating the travel lane of the vehicle 20, which are obtained by the first obtainment unit 210, and the position information of another vehicle 20, the information indicating the travel lane of another vehicle 20, and the information indicating the travel lane of the vehicle 20, which are obtained by the second obtainment unit 220.

When the capturing device provided in another vehicle 20 is the first capturing device 30 for capturing the view ahead of another vehicle 20, the position determination unit 230 determines whether the vehicle 20 is the vehicle 20 traveling ahead of another vehicle 20 based on the position information of the vehicle 20 and the position information of another vehicle 20, and, if determining that the vehicle 20 is the vehicle 20 traveling ahead of another vehicle 20, determines the position of the vehicle 20 on the map based on the position information of the vehicle 20 and the information indicating the travel lane of the vehicle 20, which are obtained by the first obtainment unit 210, and the position information of another vehicle 20, the information indicating the travel lane of another vehicle 20 detected by analyzing the image captured by the first capturing device 30, and the information indicating the travel lane of the vehicle 20 detected by analyzing the image captured by the first capturing device 30, which are obtained by the second obtainment unit 220.

When the capturing device provided in another vehicle 20 is the second capturing device 32 for capturing the view behind another vehicle 20, the position determination unit 230 may determine whether the vehicle 20 is the vehicle 20 traveling behind another vehicle 20 based on the position information of the vehicle 20 and the position information of another vehicle 20 and, if determining that the vehicle 20 is the vehicle 20 traveling behind another vehicle 20, determine the position of the vehicle 20 on the map based on the position information of the vehicle 20 and the information indicating the travel lane of the vehicle 20, which are obtained by the first obtainment unit 210, and the position information of another vehicle 20, the information indicating the travel lane of another vehicle 20 detected by analyzing the image captured by the second capturing device 32, and the information indicating the travel lane of the vehicle 20 detected by analyzing the image captured by the second capturing device, which are obtained by the second obtainment unit 220.

The second obtainment unit 220 may further obtain the distance information from another vehicle 20 to the vehicle 20 detected by analyzing the image captured by the capturing device provided in another vehicle 20. The position determination unit 230 may further determine the position of the vehicle 20 on the map based on the distance information from another vehicle 20 to the vehicle 20 obtained by the second obtainment unit 220.

The second obtainment unit 220 may further obtain the detection precision information of the distance information from another vehicle 20 to the vehicle 20. The position determination unit 230 may further determine the position of the vehicle 20 on the map based on the detection precision information of the distance information from another vehicle 20 to the vehicle 20 obtained by the second obtainment unit 220.

The first obtainment unit 210 may further obtain the detection precision information of the travel lane of the vehicle 20 detected by analyzing the image captured by the capturing device provided in the vehicle 20. The position determination unit 230 may further determine the position of the vehicle 20 based on the detection precision information of the travel lane of the vehicle 20 obtained by the first obtainment unit 210.

The second obtainment unit 220 may further obtain the detection precision information of the travel lane of the vehicle 20 detected by analyzing the image captured by the capturing device provided in another vehicle 20. The position determination unit 230 may further determine the position of the vehicle 20 based on the detection precision information of the travel lane of the vehicle 20 obtained by the second obtainment unit 220.

The first obtainment unit 210 may further obtain the detection precision information of the position information of the vehicle 20 detected by the vehicle 20. The position determination unit 230 may further determine the position of the vehicle 20 based on the detection precision information of the position information of the vehicle 20 obtained by the first obtainment unit 210.

The second obtainment unit 220 may further obtain the detection precision information of the position information of another vehicle 20 detected by another vehicle 20. The position determination unit 230 may further determine the position of the vehicle 20 based on the detection precision information of the position information of another vehicle 20 obtained by the second obtainment unit 220.

Figure 3:
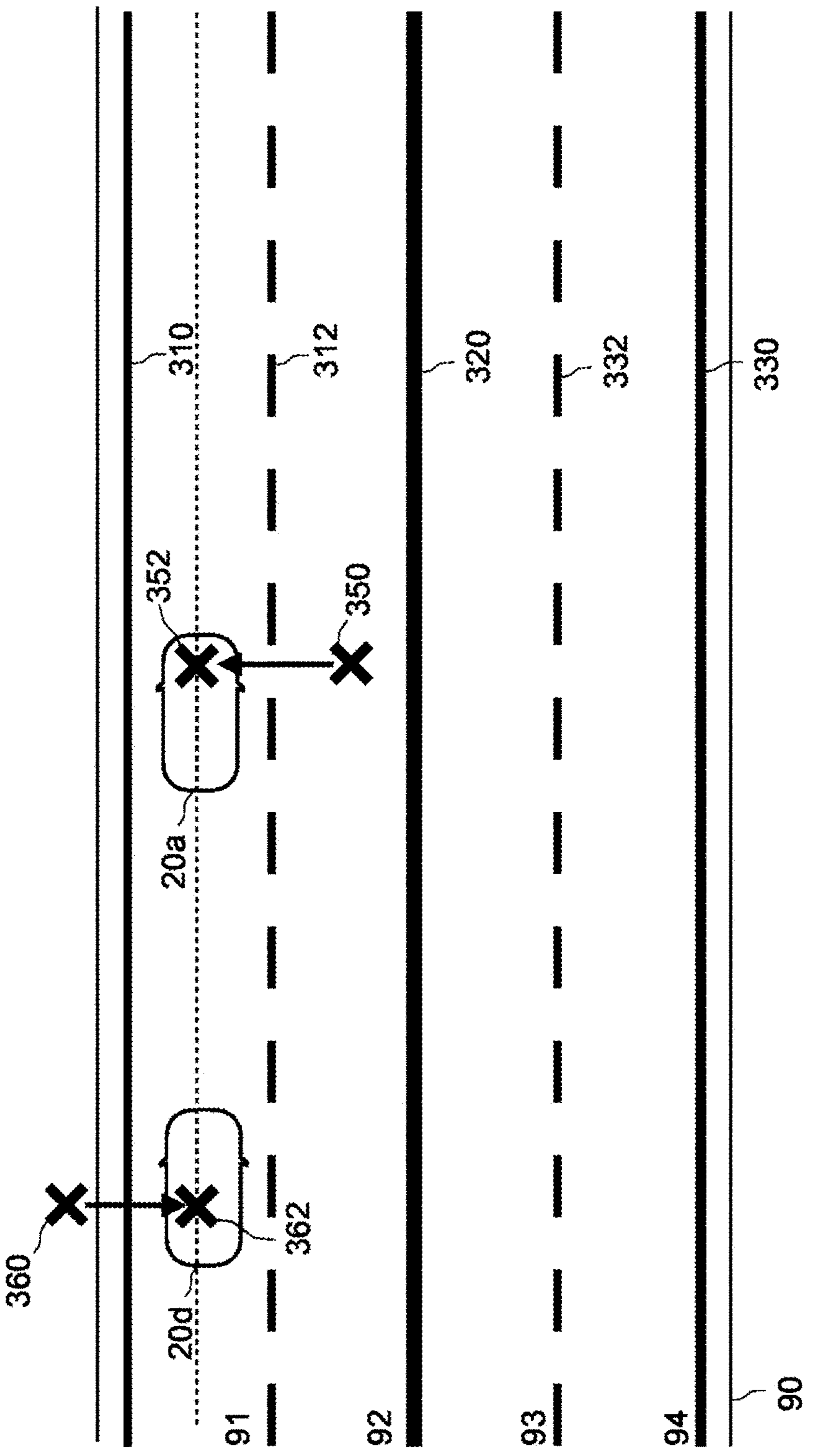
FIG. 3 is a diagram for describing an example of a process for determining the position of a vehicle 20*a* from the travel lanes of the vehicle 20*a* and a vehicle 20*d*.

FIG. 3 is a diagram for describing an example of a process to determine the position of the vehicle 20*a* based on the travel lanes of the vehicle 20*a* and the vehicle 20*d*. It is assumed that the vehicle 20*a* is traveling ahead of the vehicle 20*d* on the road 90. A lane 91, a lane 92, a lane 93, and a lane 94 are set on the road 90. A mark line 310, a mark line 312, a mark line 330, a mark line 332, and a mark line 320 are set on the road 90.

The in-vehicle processing device 40*a* provided in the vehicle 20*a* detects the lane 91 on which the vehicle 20*a* is traveling by analyzing the image captured by the first capturing device 30*a* or the second capturing device 32*a*. For example, the in-vehicle processing device 40*a* detects the position of the mark line provided on the road 90 by analyzing the image captured by the first capturing device 30*a* or the second capturing device 32*a* and detects, based on the detected position of the mark line, the lane 91 on which the vehicle 20*a* is traveling. The in-vehicle processing device 40*a* may further detect the position of a curb, a guardrail, an isolation belt, a plant, or the like as well as the mark line and further detect, based on the detected information, the lane 91 on which the vehicle 20*a* is traveling.

The in-vehicle processing device 40*a* detects the lane 91 on which the vehicle 20*d* is traveling behind the vehicle 20*a* by analyzing the image captured by the second capturing device 32*a*. The in-vehicle processing device 40*a* detects the position of the mark line provided on the road 90 by analyzing the image captured by the second capturing device 32*a* and detects, based on the detected position of the mark line and the position of the vehicle 20*d* detected from the image, the lane 91 on which the vehicle 20*d* is traveling. The in-vehicle processing device 40*a* may further detect the position of a curb, a guardrail, an isolation belt, a plant, or the like as well as the mark line and further detect, based on the detected information, the lane 91 on which the vehicle 20*d* is traveling.

The in-vehicle processing device 40*a* detects the position of the vehicle 20*a* based on the signal from the GNSS satellite received by the GNSS receiver. Here, it is assumed that the position of the vehicle 20*a* detected by the in-vehicle processing device 40*a* is the position 350 shown in FIG. 3.

The in-vehicle processing device 40*a* transmits, to the assistance device 60, the position information indicating the position of the vehicle 20*a*, the own vehicle lane information indicating the lane 91 on which the vehicle 20*a* is traveling, and another vehicle lane information indicating the lane 91 on which the vehicle 20*d* is traveling. The another vehicle lane information includes the information indicating whether the lane 91 is the travel lane of the vehicle ahead of the vehicle 20*a* or the travel lane of the vehicle behind the vehicle 20*a*.

In the assistance device 60, the first obtainment unit 210 obtains the information transmitted from the in-vehicle processing device 40*a*.

The in-vehicle processing device 40*d* provided in the vehicle 20*d* traveling behind the vehicle 20*a* detects the lane 91, on which the vehicle 20*d* is traveling, by analyzing the image captured by the first capturing device 30*d* or the second capturing device 32*d*. For example, the in-vehicle processing device 40*d* detects the lane 91 on which the vehicle 20*d* is traveling by performing a process similar to the in-vehicle processing device 40*a*.

The in-vehicle processing device 40*d* detects the lane 91 on which the vehicle 20*a* ahead of the vehicle 20*d* is traveling, by analyzing the image captured by the first capturing device 30*d*. The in-vehicle processing device 40*d* detects the position of the mark line provided on the road 90 by analyzing the image captured by the first capturing device 30*d* and detects the lane 91 on which the vehicle 20*a* is traveling based on the detected position of the mark line and the position of the vehicle 20*a* detected from the image. The in-vehicle processing device 40*d* may further detect the position of a curb, a guardrail, an isolation belt, a plant, or the like as well as the mark line and further detect the lane 91 on which the vehicle 20*a* is traveling based on the detected information.

The in-vehicle processing device 40*d* detects the position of the vehicle 20*d* based on the signal from the GNSS satellite received by the GNSS receiver. Here, it is assumed that the position of the vehicle 20*d* detected by the in-vehicle processing device 40*d* is the position 360 shown in FIG. 3.

The in-vehicle processing device 40*d* transmits, to the assistance device 60, the position information indicating the position of the vehicle 20*d*, the own vehicle lane information indicating the lane 91 on which the vehicle 20*d* is traveling, and the another vehicle lane information indicating the lane 91 on which the vehicle 20*a* is traveling. The another vehicle lane information includes the information indicating the lane 91 is the travel lane of the vehicle ahead of the vehicle 20*d* or the travel lane of the vehicle behind the vehicle 20*d*. In the assistance device 60, the second obtainment unit 220 obtains the information transmitted from the in-vehicle processing device 40*d*.

As an example, the position determination unit 230 determines that the vehicle 20*a* is traveling on the lane 91 based on the information transmitted from the in-vehicle processing device 40*a*. As a result, the position determination unit 230 determines the position 352 as the position of the vehicle 20*a* by correcting the position information transmitted from the in-vehicle processing device 40*a*, referring to the lane information of the road 90 included in the map information. The position 352 is the position obtained by shifting the position 350 to the center position of the lane 91 in the direction orthogonal to the extending direction of the road 90, for example.

Similarly, the position determination unit 230 determines that the vehicle 20*d* is traveling on the lane 91 based on the information transmitted from the in-vehicle processing device 40*d*. The position determination unit 230 determines the position 362 as the position of the vehicle 20*d* by correcting the position information transmitted from the in-vehicle processing device 40*d*, referring to the lane information of the road 90 included in the map information.

The position determination unit 230 may further determine the position of the vehicle 20*a* based on the information transmitted from the in-vehicle processing device 40*d*. For example, the position determination unit 230 determines that the vehicle 20*d* is traveling behind the vehicle 20*a* based on the position of the vehicle 20*d* and the position of the vehicle 20*a*. Furthermore, the position determination unit 230 determines, based on the information transmitted from the in-vehicle processing device 40*d*, that the vehicle 20*a* is traveling on the same lane 91 as the lane 91 on which the vehicle 20*d* is traveling. As a result, the position determination unit 230 determines the position 352 as the position of the vehicle 20*a* by correcting the position information transmitted from the in-vehicle processing device 40*a*, referring to the lane information of the road 90 included in the map information.

The position determination unit 230 may determine the position of the vehicle 20*a* by comprehensively considering the travel lane of the vehicle 20*a* detected in the in-vehicle processing device 40*a* and the travel lane of the vehicle 20*a* detected in the in-vehicle processing device 40*d*. The position determination unit 230 may determine the position of the vehicle 20*a* by considering the detection precision of the travel lane of the vehicle 20*a* detected in the in-vehicle processing device 40*a* and the detection precision of the travel lane of the vehicle 20*a* detected in the in-vehicle processing device 40*d*.

The information transmitted from the in-vehicle processing device 40*a* and the in-vehicle processing device 40*d* to the assistance device 60 may include the information indicating the detection precision of the travel lane by each in-vehicle processing device 40. The detection precision of the travel lane by the in-vehicle processing device 40 may be a predetermined and fixed value or may be a value determined through the image analysis performed by the in-vehicle processing device 40. The detection precision of the travel lane by the in-vehicle processing device 40 may be higher during the daytime hours and lower during the night hours. When the detection precision of the travel lane of the vehicle 20*a* detected in the in-vehicle processing device 40*a* is higher than the detection precision of the travel lane of the vehicle 20*a* detected in the in-vehicle processing device 40*d*, the position determination unit 230 may determine the position of the vehicle 20*a* based on the travel lane of the vehicle 20*a* detected in the in-vehicle processing device 40*a*. When the detection precision of the travel lane of the vehicle 20*a* detected in the in-vehicle processing device 40*a* is lower than the detection precision of the travel lane of the vehicle 20*a* detected in the in-vehicle processing device 40*d*, the position determination unit 230 may determine the position of the vehicle 20*a* based on the travel lane of the vehicle 20*a* detected by the in-vehicle processing device 40*d*.

Figure 4:
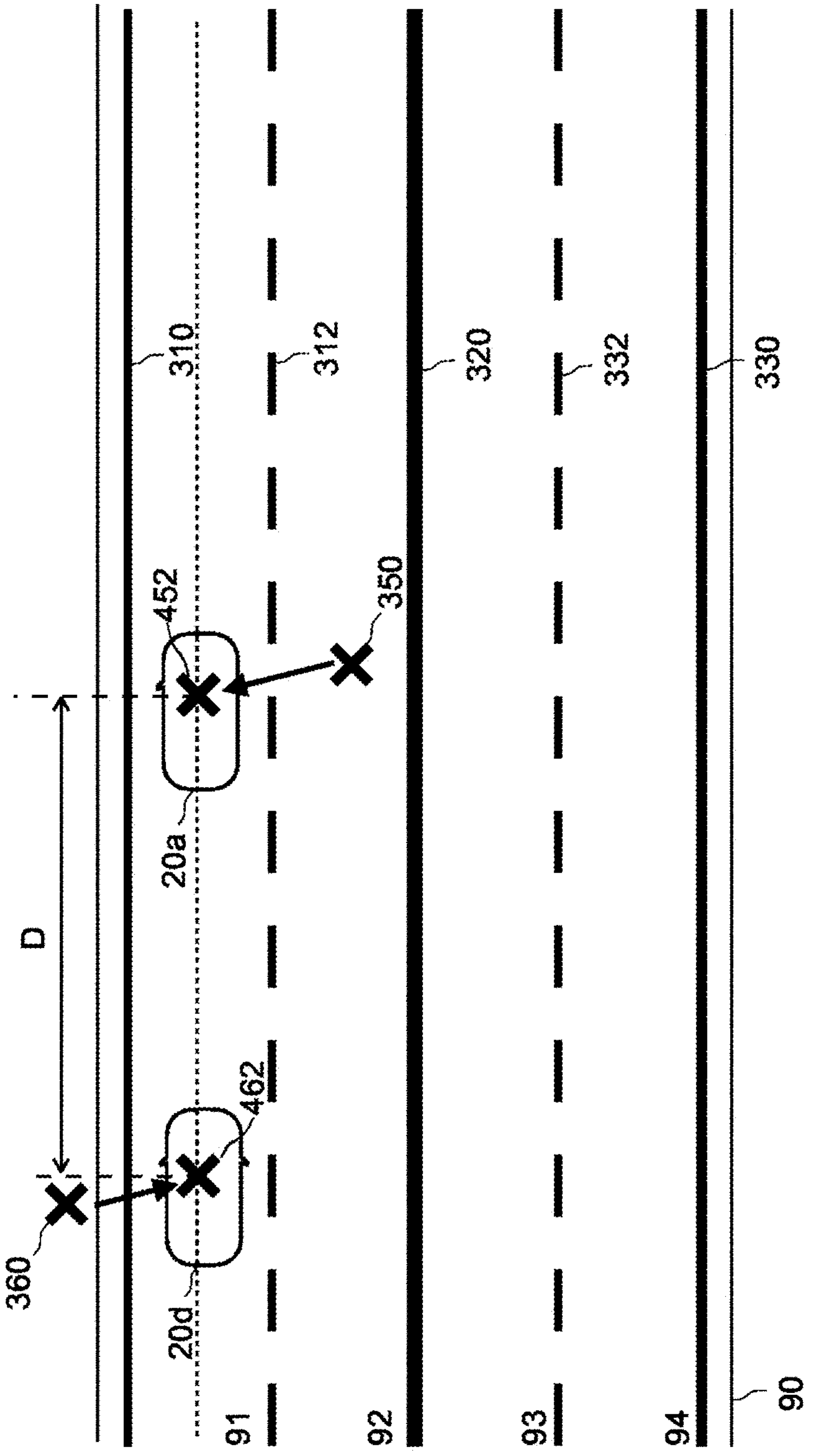
FIG. 4 is a diagram for describing an example of a process for determining the position of the vehicle 20*a* in consideration of the distance detected in the vehicle 20*d*.

FIG. 4 is a diagram for describing an example of a process for determining the position of the vehicle 20*a* by considering the distance detected in the vehicle 20*d*. Here, the description of the process which overlaps with the process of the in-vehicle processing device 40 and the assistance device 60 described with reference to FIG. 3 is omitted.

The in-vehicle processing device 40*a* detects the distance from the vehicle 20*a* to the vehicle 20*d* behind the vehicle 20*a* by using a ranging sensor included in the in-vehicle processing device 40*d*. The in-vehicle processing device 40*a* transmits, to the assistance device 60, the distance information indicating the distance from the vehicle 20*a* to the vehicle 20*d*. The in-vehicle processing device 40*a* may transmit the information indicating the detection precision of the distance by the ranging sensor of the in-vehicle processing device 40*a*, along with the distance information, to the assistance device 60. The information transmitted from the in-vehicle processing device 40*a* is obtained by the first obtainment unit 210 of the assistance device 60.

Similarly, the in-vehicle processing device 40*d* detects the distance from the vehicle 20*d* to the vehicle 20*a* ahead of the vehicle 20*d* using the ranging sensor included in the in-vehicle processing device 40*a*. The in-vehicle processing device 40*a* transmits, to the assistance device 60, the distance information indicating the distance from the vehicle 20*d* to the vehicle 20*a*. The in-vehicle processing device 40*d* may transmit, to the assistance device 60, the information indicating the detection precision of the distance by the ranging sensor of the in-vehicle processing device 40*d*, along with the distance information. The information transmitted from the in-vehicle processing device 40*d* is obtained by the second obtainment unit 220 of the assistance device 60.

The position determination unit 230 determines the distance D between the vehicle 20*a* and the vehicle 20*d* based on the distance information transmitted from the in-vehicle processing device 40*a* and/or the distance information transmitted from the in-vehicle processing device 40*d*. For example, the position determination unit 230 determines the distance D between the vehicle 20*a* and the vehicle 20*d* based on the average value of the distance indicated by the distance information transmitted from the in-vehicle processing device 40*a* and the distance indicated by the distance information transmitted from the in-vehicle processing device 40*d*. The position determination unit 230 may determine the distance D between the vehicle 20*a* and the vehicle 20*d* based on the average value of the distance indicated by the distance information transmitted from the in-vehicle processing device 40*a* and the distance indicated by the distance information transmitted from the in-vehicle processing device 40*d* which are weighed according to each precision indicated by detection precision of the distance. The position determination unit 230 may determine, as the distance D between the vehicle 20*a* and the vehicle 20*d*, the distance with the higher detection precision among the distances indicated by the distance information transmitted from the in-vehicle processing device 40*a* and the in-vehicle processing device 40*d*.

The position determination unit 230 determines the position 452 as the position of the vehicle 20*a* and also determines the position 462 as the position of the vehicle 20*d* by correcting the position information transmitted from the in-vehicle processing device 40 based on the position of the vehicle 20*a* detected in the in-vehicle processing device 40*a*, the position of the vehicle 20*d* detected in the in-vehicle processing device 40*d*, the distance D, the lane 91 on which the vehicle 20*a* is traveling, and/or the lane 91 on which the vehicle 20*d* is traveling. For example, the position 452 and the position 462 are obtained by shifting the position 350 and the position 360 to the center of the lane 91 in the direction orthogonal to the extending direction of the road 90 and also shifting the position 350 and/or the position 360 in the extending direction of the road 90 such that the distance between the position 452 and the position 462 is distance D.

If shifting the position 350 and/or the position 360 in the extending direction of the road 90 to determine the position 452 and the position 462, the position determination unit 230 may shift both the position 350 and the position 360 or may shift one of the position 350 and the position 360. The position determination unit 230 may determine whether to shift both of the position 350 and the position 360 in the extending direction of the road 90 or to shift one of the position 350 and the position 360 in the extending direction of the road 90 based on the detection precision of each of the position 350 and the position 360. The position determination unit 230 may shift only the position with the lower detection precision among the position 350 and the position 360 in the extending direction of the road 90. The position determination unit 230 may determine, according to the detection precision, the distance by which to shift each of the position 350 and the position 360 in the extending direction of the road 90. When the detection precision of the position 360 is higher than the detection precision of the position 350, the position determination unit 230 may shift the position 350 in the extending direction of the road 90 by a longer distance than the distance by which to shift the position 360 in the extending direction of the road 90. When the detection precision of the position 360 is higher than the detection precision of the position 350 and the detection precision of the position 360 is higher than a predetermined value, the position determination unit 230 may shift only the position 350 in the extending direction of the road 90.

In an example in FIG. 3 and FIG. 4, an example of a process was mainly described in which the position of the vehicle 20*a* is determined based on the travel lane information of the vehicle 20*a* detected by the in-vehicle processing device 40*d* of the vehicle 20*d* behind the vehicle 20*a*. However, since a similar process can also be applied to the process to determine the position of the vehicle 20*a* based on the travel lane information of the vehicle 20*a* detected by the in-vehicle processing device 40 of the vehicle 20 ahead of the vehicle 20*a*, the description is omitted.

Figure 5:
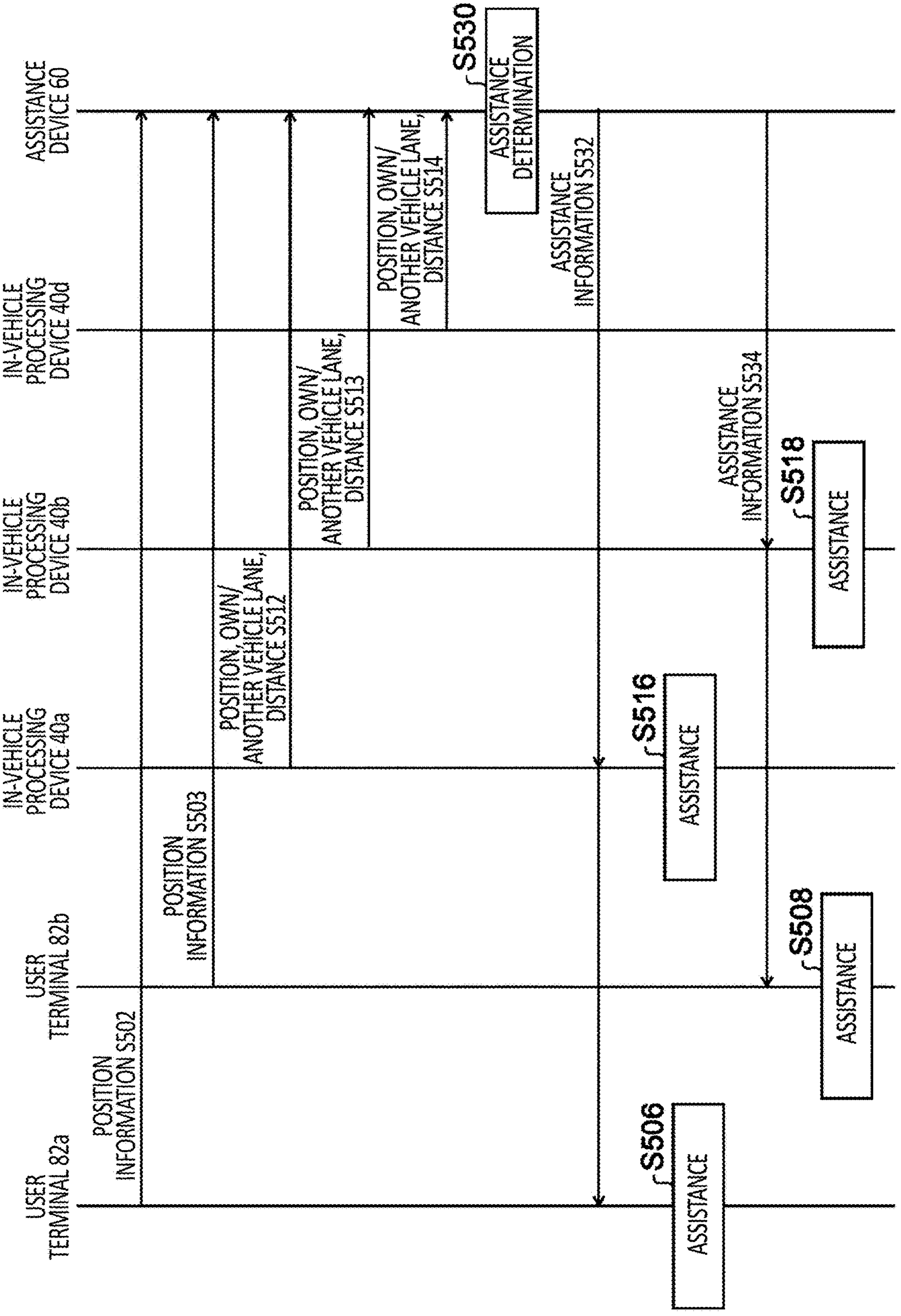
FIG. 5 shows an example of the execution sequence of processes performed by a user terminal 82, an in-vehicle processing device 40 included in the vehicle 20, and an assistance device 60.

FIG. 5 shows an example of the execution sequence of the processes performed by the user terminal 82, the in-vehicle processing device 40 included in the vehicle 20, and the assistance device 60.

In S502, the user terminal 82*a* transmits, to the assistance device 60, the position information indicating the current position of the user terminal 82*a* based on the signal received from the GNSS satellite. The position information is periodically transmitted from the user terminal 82*a* to the assistance device 60.

In S503, the user terminal 82*b* transmits, to the assistance device 60, the position information indicating the current position of the user terminal 82*b* based on the signal received from the GNSS satellite. The position information is periodically transmitted from the user terminal 82*b* to the assistance device 60.

In S512, the in-vehicle processing device 40*a* transmits, to the assistance device 60, the position information indicating the current position of the vehicle 20*a* based on the signal received from the GNSS satellite, the information indicating the travel lane of the vehicle 20*a*, the travel lane information indicating the travel lane of another vehicle traveling ahead of and/or behind the vehicle 20*a*, and the distance information indicating the distance to the another vehicle. In S512, the in-vehicle processing device 40*a* may transmit the information indicating the detection precision of each of the position, the travel lane, and the distance by the in-vehicle processing device 40*a*. The information is periodically transmitted from the in-vehicle processing device 40*a* to the assistance device 60.

In S513, the in-vehicle processing device 40*b* transmits, to the assistance device 60, the position information indicating the current position of the vehicle 20*b* based on the signal received from the GNSS satellite, the information indicating the travel lane of the vehicle 20*b*, the travel lane information indicating the travel lane of another vehicle traveling ahead of and/or behind the vehicle 20*b*, and the distance information indicating the distance of the another vehicle. In S513, the in-vehicle processing device 40*b* may transmit the information indicating the detection precision of each of the position, the travel lane, and the distance by the in-vehicle processing device 40*b*. The information is periodically transmitted from the in-vehicle processing device 40*b* to the assistance device 60.

In S514, the in-vehicle processing device 40*d* transmits, to the assistance device 60, the position information indicating the current position of the vehicle 20*d* based on the signal received from the GNSS satellite, the information indicating the travel lane of the vehicle 20*d*, the travel lane information indicating the travel lane of another vehicle traveling ahead of and/or behind the vehicle 20*d*, and the distance information indicating the distance to the another vehicle. In S514, the in-vehicle processing device 40*d* may transmit the information indicating the detection precision of each of the position, the travel lane, and the distance by the in-vehicle processing device 40*d*. The information is periodically transmitted from the in-vehicle processing device 40*d* to the assistance device 60.

In S530, the assistance control unit 260 of the assistance device 60 determines whether to perform the traffic assistance for the vehicle 20 and the user terminal 82 based on the information received in S502, S503, S512, S513, and S514. For example, the position determination unit 230 determines the position of the vehicle 20 based on the information received in S512, S513, and S514 by using the method described with reference to FIG. 3, FIG. 4, and the like. Based on the position of the vehicle 20 determined by the position determination unit 230 and the position of the user terminal 82 received in S502 and S503, the assistance control unit 260 determines whether the vehicle 20 and the user terminal 82 will approach each other within a predetermined distance within a predetermined time and/or whether the vehicle 20 and another vehicle 20 will approach each other within a predetermined distance within a predetermined time. The assistance control unit 260 determines to perform the traffic assistance when it determines that the vehicle 20 and the user terminal 82 will approach each other within a predetermined distance within a predetermined time and/or when it determines that the vehicle 20 and another vehicle 20 will approach each other within a predetermined distance within a predetermined time.

In the present embodiment, the assistance control unit 260 determines that the user terminal 82*a* and the vehicle 20*a* will approach each other within a predetermined distance within a predetermined time and determines that the vehicle 20*b* and the user terminal 82*b* will approach each other within a predetermined distance within a predetermined time. As a result, in S532, the assistance control unit 260 controls the communication device 290 to transmit, to each of the in-vehicle processing device 40*a* and the user terminal 82*a*, the assistance information instructing the in-vehicle processing device 40*a* and the user terminal 82*a* to output an alarm. Furthermore, in S534, the assistance control unit 260 controls the communication device 290 to transmit, to each of the in-vehicle processing device 40*b* and the user terminal 82*b*, the assistance information instructing the in-vehicle processing device 40*b* and the user terminal 82*b* to output an alarm.

When receiving the assistance information from the assistance device 60, in S506, the user terminal 82*a* uses the Human Machine Interface (HMI) function equipped in the user terminal 82*a* to inform the user 80*a* that there is a vehicle 20 approaching the user 80*a*. The user terminal 82*a* may inform, through voice, that there is a vehicle approaching the user 80*a*.

When receiving the assistance information from the assistance device 60, in S516, the in-vehicle processing device 40*a* uses the HMI function equipped in the in-vehicle processing device 40*a* to inform the occupant of the vehicle 20*a* that there is a user approaching the vehicle 20*a*. The in-vehicle processing device 40*a* may inform the occupant of the vehicle 20*a* that there is a vehicle approaching the vehicle 20*a*, through voice or through display on a display device included in the vehicle 20*a*.

When receiving the assistance information from the assistance device 60, in S508, the user terminal 82*b* uses the HMI function equipped in the user terminal 82*b* to inform the user 80*b* that there is a vehicle approaching the user 80*b*. The user terminal 82*b* may inform, through voice, the user 80*b* that there is a vehicle approaching the user 80*b*.

When receiving the assistance information from the assistance device 60*b*, in S518, the in-vehicle processing device 40*b* uses the HMI function equipped in the in-vehicle processing device 40*b* to inform the occupant of the vehicle 20*b* that there is a vehicle approaching the vehicle 20*b*. The in-vehicle processing device 40*b* may inform the occupant of the vehicle 20*b* that there is a vehicle approaching the vehicle 20*b*, through voice and through display on a display device included in the vehicle 20*b*.

Figure 6:
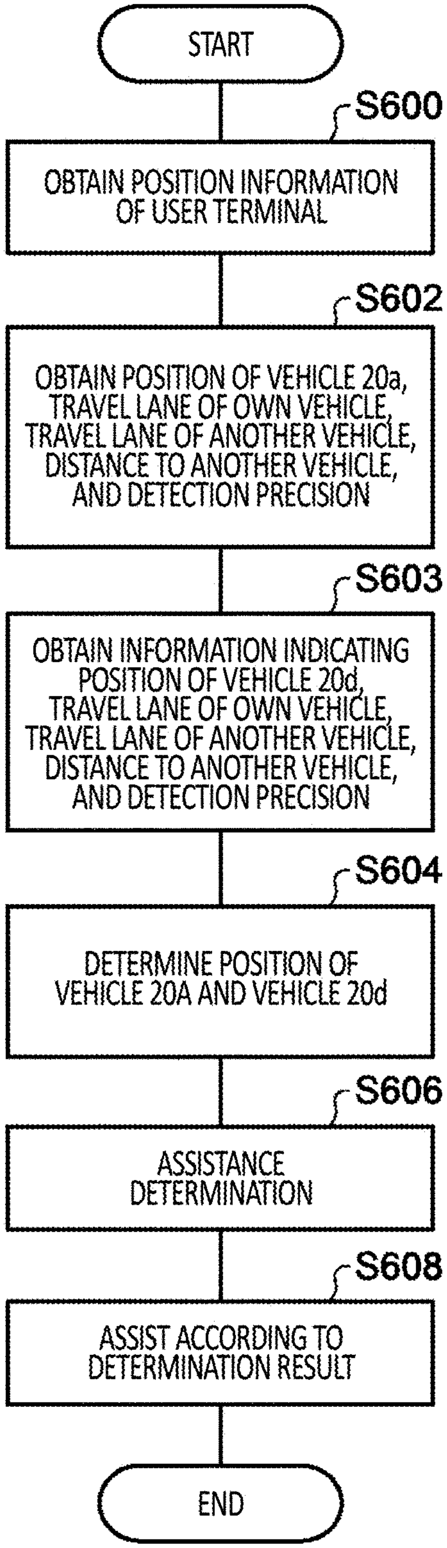
FIG. 6 shows an example of a flowchart related to an assistance control method performed by the assistance device 60.

FIG. 6 shows an example of the flowchart related to the assistance control method performed by the assistance device 60. The process of this flowchart may be performed repeatedly. Here, a process of determining the position of the vehicle 20*a* and an assistance control based on the position are particularly cited and described.

In S600, the obtainment unit 202 obtains the position information transmitted from the user terminal 82.

In S602, the first obtainment unit 210 obtains the information transmitted from the in-vehicle processing device 40*a* of the vehicle 20*a*, indicating the position of the vehicle 20*a*, the travel lane of the vehicle 20*a*, the travel lane of another vehicle 20 ahead of and/or behind the vehicle 20*a*, and the distance to another vehicle 20, and the information indicating the detection precision of each piece of information.

In S603, the second obtainment unit 220 obtains the information transmitted from the in-vehicle processing device 40*d* of the vehicle 20*d*, indicating the position of the vehicle 20*d*, the travel lane of the vehicle 20*d*, the travel lane of another vehicle 20 ahead of and/or behind the vehicle 20*d*, and the distance to another vehicle 20, and the information indicating the detection precision of each piece of information.

In S604, the position determination unit 230 determines the position of the vehicle 20*a* by using the method described with reference to FIG. 3, FIG. 4, and the like. S606, the assistance control unit 260 performs the determination about the approaching described above based on the position of the vehicle 20*a* calculated in S606 and the position of the user terminal 82 obtained in S600 to determine whether to perform the traffic assistance for the vehicle 20*a* and the user terminal 82*a*. When it determines to perform the traffic assistance for the vehicle 20*a* and the user terminal 82*a*, it performs control related to the traffic assistance in S608.

According to the assistance system 10 described above, the assistance device 60 can determine the position of the vehicle 20 based on the position and the travel lane of the vehicle 20 detected by the in-vehicle processing device 40. Even if the position detection precision based on the signal from the GNSS satellite is low, the assistance device 60 can determine that the vehicle 20 is traveling on the travel lane detected by the in-vehicle processing device 40 and match the travel lane against the map information to determine the position of the vehicle 20. As a result, the position determination precision of the vehicle 20 can be improved.

Figure 7:
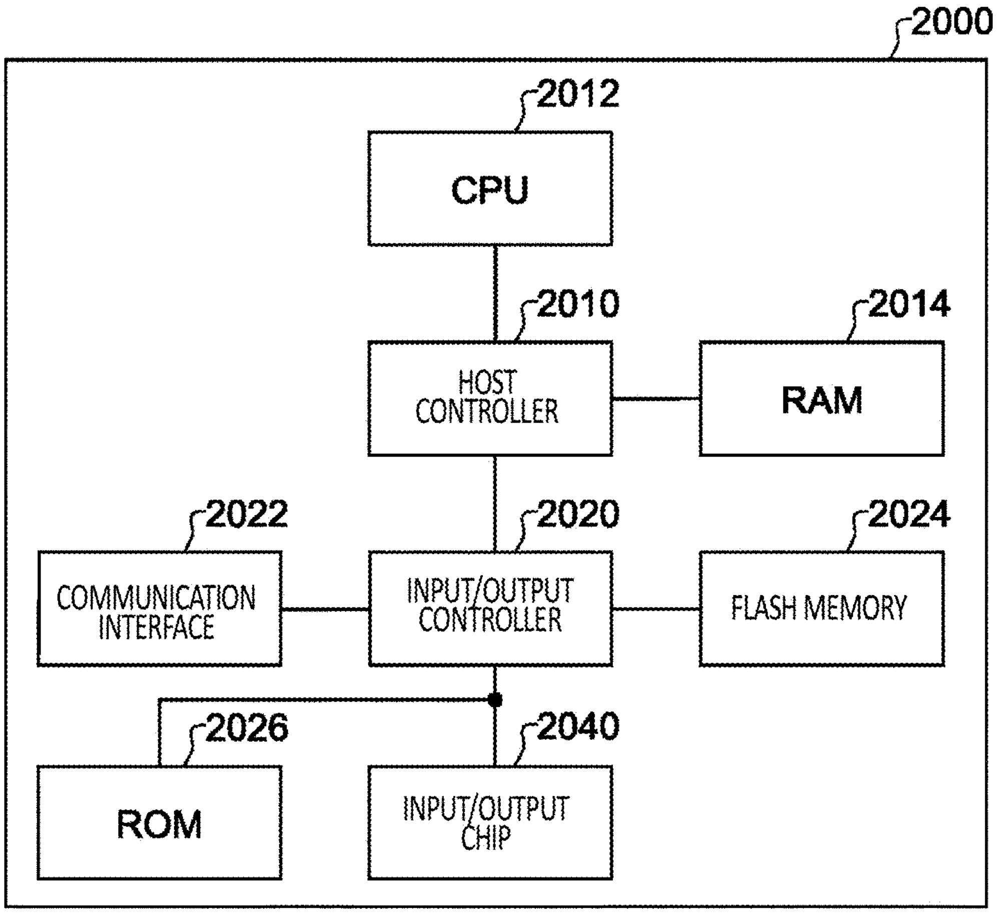
FIG. 7 shows an example of a computer 2000.

FIG. 7 shows an example of a computer 2000 in which a plurality of embodiments of the present invention may be entirely or partially embodied. The program installed on the computer 2000 can cause the computer 2000 to function as a device such as the assistance device 60 according to an embodiment or each unit of the device, perform the operation associated with the device or each unit of the device, and/or perform a process according to an embodiment or the steps of the process. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, and thereby controls each unit.

The communication interface 2022 communicates with another electronic device via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, a HDMI (registered trademark) port.

A program is provided via a network or a computer-readable storage medium such as a CD-ROM, a DVD-ROM, or a memory card. The RAM 2014, the ROM 2026, or the flash memory 2024 is an example of the computer-readable storage medium. The program is installed in the flash memory 2024, the RAM 2014, or the ROM 2026, and executed by the CPU 2012.

Information processing written in these programs is read by the computer 2000, and provides cooperation between the programs and the various types of hardware resources described above. An apparatus or a method may be actualized by executing operations or processing of information depending on a use of the computer 2000.

For example, when a communication is executed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and execute various kinds of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various kinds of processing including various kinds of operations, information processing, conditional judgement, conditional branching, unconditional branching, information retrieval/replacement, or the like described herein and specified by instruction sequences of the programs, and write back a result into the RAM 2014. In addition, the CPU 2012 may retrieve information in a file, a database, or the like in the recording medium. For example, when multiple entries each having an attribute value of a first attribute associated with an attribute value of a second attribute, is stored in the recording medium, the CPU 2012 may retrieve an entry having a designated attribute value of the first attribute that matches a condition from these multiple entries, and read the attribute value of the second attribute stored in this entry, thereby obtaining the attribute value of the second attribute associated with the first attribute that satisfies a predetermined condition.

The programs or software modules described above may be stored in the computer-readable storage medium on the computer 2000 or in the vicinity of the computer 2000.

A recording medium such as a hard disk or a RAM provided in a server system connected to a dedicated communication network or the Internet can be used as the computer-readable storage medium. A program stored in the computer-readable storage medium may be provided to the computer 2000 via a network.

The program which is installed on the computer 2000 and causes the computer 2000 to function as the assistance device 60 may instruct the CPU 2012 or the like to cause the computer 2000 to each function as each unit of the assistance device 60 (for example, the assistance control device 200 or the like). The information processing described in these programs is read by the computer 2000 to function as each unit of the assistance device 60, which is a specific means in which the software and the various hardware resources described above cooperate. These specific means implement operations or processing of information according to the intended use of the computer 2000 in the present embodiment, and the assistance device 60 is thereby constructed to be specific for the intended use.

Various embodiments have been described with reference to the block diagrams and the like. In the block diagrams, each block may represent (1) a stage of a process in which an operation is executed, or (2) each unit of the device having a role in executing the operation. A specific stage and each unit may be implemented by a dedicated circuit, a programmable circuit supplied with computer-readable instructions stored on a computer-readable storage medium, and/or a processor supplied with computer-readable instructions stored on a computer-readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and another logical operation, and a memory element such as a flip-flop, a register, a field programmable gate array (FPGA), a programmable logic array (PLA), or the like.

The computer-readable storage medium may include any tangible device capable of storing instructions to be executed by an appropriate device. Thereby, the computer-readable storage medium having instructions stored therein forms at least a part of a product including instructions which can be executed to provide means for executing processing procedures or operations specified in the block diagrams. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disc (DVD), a Blu-ray (registered trademark) disc, a memory stick, an integrated circuit card, or the like.

The computer-readable instructions may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, a special purpose computer, or another programmable data processing device, or to programmable circuit, locally or via a local area network (LAN), wide area network (WAN) such as the Internet, and a computer-readable instruction may be executed to provide means for executing operations specified in the described processing procedures or block diagrams. Examples of the processor include a computer processor, a processing unit, a microprocessor, a digital signal processor, a controller, a microcontroller, and the like.

While the present invention has been described by way of the embodiments, the technical scope of the present invention is not limited to the scope described in the above-described embodiments. It is apparent to persons skilled in the art that various alterations or improvements can be made to the above-described embodiments. It is also apparent from description of the claims that the embodiments to which such alterations or improvements are made can be included in the technical scope of the present invention.

The operations, procedures, steps, and stages etc. of each process performed by a device, system, program, and method shown in the claims, specification, or diagrams can be executed in any order as long as the order is not indicated by "before", "prior to", or the like and as long as the output from a previous process is not used in a later process. Even if the operation flow is described using phrases such as "first" or "next" for the sake of convenience in the claims, specification, or drawings, it does not necessarily mean that the process must be performed in this order.

EXPLANATION OF REFERENCES

10: assistance system;
20: vehicle;
30: first capturing device;
32: second capturing device;
40: in-vehicle processing device;
60: assistance device;
80: user;
82: user terminal;
90: road
91, 92, 93, 94: lane;
200: assistance control device;
202: obtainment unit;
210 first obtainment unit;
220: second obtainment unit;
230: position determination unit;
260: assistance control unit;
280: storage device;
290: communication device;
310, 312, 330, 332: mark line;
350, 352, 360, 362, 452, 462: position;
2000: computer;
2010: host controller;
2012: CPU;
2014: RAM
2020: input/output controller;
2022: communication interface;
2024: flash memory;
2026 ROM;
2040: input/output chip.

What is claimed is:

1. An assistance control device comprising at least one processor configured to:

obtain position information of a first vehicle detected in the first vehicle and information indicating a travel lane of the first vehicle detected by analyzing a first image captured by a capturing at the first vehicle;

determine a position of the first vehicle on a map based on the position information of the first vehicle and the information indicating the travel lane of the first vehicle detected by analyzing the first image;

perform control for traffic assistance for the first vehicle based on the position of the first vehicle that is determined; and obtain position information of a second vehicle detected in the second vehicle, which is a vehicle other than the first vehicle, information indicating a travel lane of the second vehicle detected by analyzing a second image captured at the second vehicle, and information indicating a travel lane of the first vehicle detected by analyzing the second image, wherein when the second image captured at the second vehicle is an image that captures a view ahead of the second vehicle, the at least one processor is further configured to determine whether the first vehicle is a vehicle traveling ahead of the second vehicle based on the position information of the first vehicle and the position information of the second vehicle, and if the first vehicle is determined to be the vehicle traveling ahead of the second vehicle, determine the position of the first vehicle on the map based on the position information of the first vehicle, the information indicating the travel lane of the first vehicle detected by analyzing the first image, the position information of the second vehicle, the information indicating the travel lane of the second vehicle detected by analyzing the second image, and the information indicating the travel lane of the first vehicle detected by analyzing the second image.

2. An assistance control device comprising at least one processor configured to:

obtain position information of a first vehicle detected in the first vehicle and information indicating a travel lane of the first vehicle detected by analyzing a first image captured at the first vehicle;

determine a position of the first vehicle on a map based on the position information of the first vehicle and the information indicating the travel lane of the first vehicle detected by analyzing the first image;

perform control for traffic assistance for the first vehicle based on the position of the first vehicle that is determined; and obtain position information of a second vehicle detected in the second vehicle, which is a vehicle other than the first vehicle, information indicating a travel lane of the second vehicle detected by analyzing a second image captured at the second vehicle, and information indicating a travel lane of the first vehicle detected by analyzing the second image, wherein when the second image captured at the second vehicle is an image that captures a view behind the second vehicle, the at least one processor is further configured to determine whether the first vehicle is a vehicle traveling behind the second vehicle based on the position information of the first vehicle and the position information of the second vehicle, and if the first vehicle is determined to be the vehicle traveling behind the second vehicle, determine the position of the first vehicle on the map based on the position information of the first vehicle, the information indicating the travel lane of the first vehicle detected by analyzing the first image, the position information of the second vehicle, the information indicating the travel lane of the second vehicle detected by analyzing the second image, and the information indicating the travel lane of the first vehicle detected by analyzing the second image.

3. The assistance control device according to claim 1, wherein the at least one processor is further configured to:

obtain distance information from the second vehicle to the first vehicle detected by analyzing the second image; and determine the position of the first vehicle on the map based on the distance information from the second vehicle to the first vehicle.

4. The assistance control device according to claim 1, wherein the at least one processor is further configured to:

obtain detection precision information of the travel lane of the first vehicle detected by analyzing the first image; and determine the position of the first vehicle based on the detection precision information of the travel lane of the first vehicle detected by analyzing the first image.

5. The assistance control device according to claim 1, wherein the at least one processor is further configured to:

obtain detection precision information of the travel lane of the first vehicle detected by analyzing the second image; and determine the position of the first vehicle based on the detection precision information of the travel lane of the first vehicle detected by analyzing the second image.

6. The assistance control device according to claim 1, wherein the at least one processor is further configured to:

obtain detection precision information of the position information of the first vehicle detected in the first vehicle; and determine the position of the first vehicle based on the detection precision information of the position information of the first vehicle.

7. The assistance control device according to claim 1, wherein the at least one processor is further configured to:

obtain detection precision information of the position information of the second vehicle detected in the second vehicle; and determine the position of the first vehicle based on the detection precision information of the position information of the second vehicle.

8. The assistance control device according to claim 3, wherein the at least one processor is further configured to:

obtain detection precision information of the distance information from the second vehicle to the first vehicle; and determine the position of the first vehicle on the map based on the detection precision information of the distance information from the second vehicle to the first vehicle.

9. The assistance control device according to claim 2, wherein the at least one processor is further configured to:

obtain distance information from the second vehicle to the first vehicle detected by analyzing the second image; and determine the position of the first vehicle on the map based on the distance information from the second vehicle to the first vehicle.

10. The assistance control device according to claim 2, wherein the at least one processor is further configured to:

obtain detection precision information of the travel lane of the first vehicle detected by analyzing the first image; and determine the position of the first vehicle based on the detection precision information of the travel lane of the first vehicle detected by analyzing the first image.

11. The assistance control device according to claim 2, wherein the at least one processor is further configured to:

obtain detection precision information of the travel lane of the first vehicle detected by analyzing the second image; and determine the position of the first vehicle based on the detection precision information of the travel lane of the first vehicle detected by analyzing the second image.

12. The assistance control device according to claim 2, wherein the at least one processor is further configured to:

obtain detection precision information of the position information of the first vehicle detected in the first vehicle; and determine the position of the first vehicle based on the detection precision information of the position information of the first vehicle.

13. An assistance control method comprising:

obtaining position information of a first vehicle detected in the first vehicle and information indicating a travel lane of the first vehicle detected by analyzing a first image captured at the first vehicle;

determining a position of the first vehicle on a map based on the position information of the first vehicle and the information indicating the travel lane of the first vehicle detected by analyzing the first image;

performing control for traffic assistance for the first vehicle based on the position of the first vehicle determined in the determining the position of the first vehicle; and obtaining position information of a second vehicle detected in the second vehicle, which is a vehicle other than the first vehicle, information indicating a travel lane of the second vehicle detected by analyzing a second image captured at the second vehicle, and information indicating a travel lane of the first vehicle detected by analyzing the second image, wherein when the second image captured at the second vehicle is an image that captures a view ahead of the second vehicle, determining whether the first vehicle is a vehicle traveling ahead of the second vehicle based on the position information of the first vehicle and the position information of the second vehicle, and if the first vehicle is determined to be the vehicle traveling ahead of the second vehicle, determining the position of the first vehicle on the map based on the position information of the first vehicle, the information indicating the travel lane of the first vehicle detected by analyzing the first image, the position information of the second vehicle, the information indicating the travel lane of the second vehicle detected by analyzing the second image, and the information indicating the travel lane of the first vehicle detected by analyzing the second image.

14. A non-transitory computer-readable storage medium which stores a program thereon, wherein the program causes a computer, when executed by the computer, to execute:

obtaining position information of a first vehicle detected in the first vehicle and information indicating a travel lane of the first vehicle detected by analyzing a first image captured at the first vehicle;

determining a position of the first vehicle on a map based on the position information of the first vehicle and the information indicating the travel lane of the first vehicle detected by analyzing the first image;

performing control for traffic assistance for the first vehicle based on the position of the first vehicle determined in the determining the position of the first vehicle; and obtaining position information of a second vehicle detected in the second vehicle, which is a vehicle other than the first vehicle, information indicating a travel lane of the second vehicle detected by analyzing a second image captured at the second vehicle, and information indicating a travel lane of the first vehicle detected by analyzing the second image, wherein when the second image captured at the second vehicle is image that captures a view ahead of the second vehicle, determining whether the first vehicle is a vehicle traveling ahead of the second vehicle based on the position information of the first vehicle and the position information of the second vehicle, and if the first vehicle is determined to be the vehicle traveling ahead of the second vehicle, determining the position of the first vehicle on the map based on the position information of the first vehicle, the information indicating the travel lane of the first vehicle detected by analyzing the first image, the position information of the second vehicle, the information indicating the travel lane of the second vehicle detected by analyzing the second image, and the information indicating the travel lane of the first vehicle detected by analyzing the second image.

15. The assistance control device according to claim 2, wherein the at least one processor is further configured to:

obtain detection precision information of the position information of the second vehicle detected in the second vehicle; and determine the position of the first vehicle based on the detection precision information of the position information of the second vehicle.

16. The assistance control device according to claim 9, wherein the at least one processor is further configured to:

obtain detection precision information of the distance information from the second vehicle to the first vehicle; and determine the position of the first vehicle on the map based on the detection precision information of the distance information from the second vehicle to the first vehicle.

* * * * *